United States Patent
Kalb et al.

(10) Patent No.: US 8,607,882 B2
(45) Date of Patent: Dec. 17, 2013

(54) LOAD BALANCING SPHERICAL DIAMETER SINGLE SEAT BALL SYSTEM

(75) Inventors: Frank David Kalb, Lantana, TX (US); Liam Andrew Aitken, Plano, TX (US); Andrew John Webber, Coppell, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 393 days.

(21) Appl. No.: 13/095,286

(22) Filed: Apr. 27, 2011

(65) Prior Publication Data

US 2012/0273223 A1 Nov. 1, 2012

(51) Int. Cl.
*E21B 34/10* (2006.01)
*F16K 5/00* (2006.01)

(52) U.S. Cl.
USPC ...... 166/386; 166/373; 166/332.3; 166/334.2

(58) Field of Classification Search
USPC ............... 166/373, 386, 332.1, 332.3, 334.2; 251/317
See application file for complete search history.

(56) References Cited

U.S. PATENT DOCUMENTS

| | | | |
|---|---|---|---|
| 3,356,333 A * | 12/1967 | Scaramucci | 251/172 |
| 3,401,916 A | 9/1968 | Scaramucci | |
| 3,462,120 A * | 8/1969 | Priese | 251/315.14 |
| 3,548,858 A * | 12/1970 | Wolfensperger | 137/246.22 |
| 3,617,027 A * | 11/1971 | Scaramucci | 251/315.01 |
| 3,765,647 A * | 10/1973 | Grove et al. | 251/317 |
| 3,883,112 A * | 5/1975 | Milleville et al. | 251/174 |
| 3,990,465 A * | 11/1976 | Allen | 137/72 |
| 4,061,307 A * | 12/1977 | Yoshiike et al. | 251/315.08 |
| 4,071,220 A * | 1/1978 | Iino | 251/174 |
| 4,262,688 A * | 4/1981 | Bialkowski | 137/242 |
| 4,280,522 A * | 7/1981 | Pechnyo et al. | 137/72 |
| 4,293,038 A | 10/1981 | Evans | |
| 4,318,420 A * | 3/1982 | Calvert | 137/74 |
| 4,582,140 A * | 4/1986 | Barrington | 166/334.2 |
| 4,624,317 A * | 11/1986 | Barrington | 166/321 |
| 4,747,578 A * | 5/1988 | Kivipelto et al. | 251/159 |
| 4,883,253 A * | 11/1989 | Hashimoto et al. | 251/315.01 |
| 4,899,980 A * | 2/1990 | Kemp | 251/175 |
| 5,145,150 A * | 9/1992 | Brooks | 251/188 |
| 5,338,003 A * | 8/1994 | Beson | 251/172 |
| 5,634,626 A * | 6/1997 | Hartman | 251/315.07 |
| 6,206,376 B1 | 3/2001 | Hartman et al. | |

(Continued)

FOREIGN PATENT DOCUMENTS

EP 1860276 A1 11/2007

OTHER PUBLICATIONS

Foreign communication from a related counterpart application—International Search Report and Written Opinion, PCT/US2012/034053, Nov. 29, 2012, 10 pages.

*Primary Examiner* — Jennifer H Gay
(74) *Attorney, Agent, or Firm* — Scott Wendorf; Conley Rose, P.C.

(57) ABSTRACT

A ball valve comprises a housing, a first seat surface, a second seat surface, and a ball rotatably movable within the housing. The ball contacts at least one of the first seat surface and the second seat surface to form a seal within the ball valve. The first seat surface and the second seat surface are fixed relative to each other, and pressure acting in a first direction and in a second direction opposite the first direction increases the contact pressure of the first seat surface and the second seat surface with the ball.

20 Claims, 3 Drawing Sheets

(56) References Cited

U.S. PATENT DOCUMENTS

| | | | |
|---|---|---|---|
| 6,293,517 B1* | 9/2001 | Cunningham | 251/315.02 |
| 6,435,474 B1 | 8/2002 | Williams et al. | |
| 7,032,880 B2* | 4/2006 | Scaramucci | 251/172 |
| 7,275,564 B2* | 10/2007 | Bazin et al. | 137/625.47 |
| 7,617,876 B2* | 11/2009 | Patel et al. | 166/373 |
| 7,758,016 B2 | 7/2010 | Scott et al. | |
| 8,151,887 B2* | 4/2012 | Dcosta et al. | 166/319 |
| 2009/0065212 A1* | 3/2009 | DCosta et al. | 166/319 |
| 2011/0114325 A1* | 5/2011 | Coghill et al. | 166/332.3 |
| 2012/0273223 A1* | 11/2012 | Kalb et al. | 166/373 |

* cited by examiner

FIG.3 ically include a ball seat for receiving a sealing ball. In traditional ball valves, the valve is closed by seating the ball on the ball seat to form a seal. The seal may be formed along a single sharp point to provide a seal. However, high pressures and loads may cause the ball and/or the ball seat to deform, making it difficult to provide a consistent seal throughout the life of the ball valve.

LOAD BALANCING SPHERICAL DIAMETER SINGLE SEAT BALL SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wellbores are sometimes drilled into subterranean formations that contain hydrocarbons to allow recovery of the hydrocarbons. During the drilling and production of a hydrocarbon bearing formation, various procedures may be performed that involve temporarily isolating fluid flowing into or out of the formation through a wellbore tubular. Such procedures can include flow control operations, completion operations, and/or interventions. Various valves, including ball valves, may be used during these procedures to control the flow of fluid through the wellbore tubular. Ball valves generally include a ball seat for receiving a sealing ball. In traditional ball valves, the valve is closed by seating the ball on the ball seat to form a seal. The seal may be formed along a single sharp point to provide a seal. However, high pressures and loads may cause the ball and/or the ball seat to deform, making it difficult to provide a consistent seal throughout the life of the ball valve.

SUMMARY

In an embodiment, a ball valve comprises: a housing; a first seat surface; a second seat surface, wherein the first seat surface and the second seat surface are fixed relative to each other; and a ball rotatably movable within the housing and contacting at least one of the first seat surface and the second seat surface to form a seal within the ball valve; wherein pressure acting in a first direction and in a second direction opposite the first direction increases the contact pressure of the first seat surface and the second seat surface with the ball. The ball valve may also have a connection component to allow the ball valve to be connected to additional components. The ball valve may also have an actuation mechanism to open or close the ball valve. At least one of the first seat surface and the second seat surface may comprise raised lands on the surface of a seat member. The ball may comprise a spherical surface, and the first seat surface and the second seat surface may be spherically matched to the surface of the ball. A position of the first seat surface and a position of the second seat surface may be chosen so that a force on the ball due to a pressure acting in the first direction and a force on the ball due to a pressure acting in the second direction are balanced to within about 20%. The ball valve may also have a biasing device arranged to bias the first seat surface and the second seat surface into a position in which they are in contact with the ball.

In an embodiment, a ball valve comprises: a housing; a seat member with a first sealing diameter; a plurality of seat surfaces with corresponding seat surface diameters disposed on the seat member, wherein the plurality of seat surfaces are fixed relative to each other; a body member with a second sealing diameter disposed in contact with the seat member; a ball rotatably movable within the housing and contacting at least one of the plurality of seat surfaces to form a seal within the ball valve; wherein the seat surface diameters, the first sealing diameter, and the second sealing diameter are chosen so that a force on the ball due to a pressure from above the ball and a force on the ball due to a pressure from below the ball are balanced to within about 20%. The ball may comprise a spherical surface and wherein the plurality of seat surfaces are spherically matched to the surface of the ball. The ball and the plurality of seat surfaces may be metal, allowing a metal to metal seal to be formed between the ball and the plurality of seat surfaces. A diameter of an innermost edge of an innermost seat surface of the plurality of seat surfaces may be less than the second sealing diameter. A diameter of an outermost edge of an outermost seat surface of the plurality of seat surfaces may be greater than the first sealing diameter. The second sealing diameter may be greater than the first sealing diameter. The plurality of seat surfaces may be located on a same hemisphere of the ball. The seat surface diameters, the first sealing diameter, and the second sealing diameter may be chosen so that a force on the ball due to a pressure from above the ball and a force on the ball due to a pressure from below the ball are balanced to within about 30,000 pounds-force.

In an embodiment, a method comprises: providing a ball valve that comprises: a housing; a plurality of seat surfaces; wherein the plurality of seat surfaces are fixed relative to each other; and a ball rotatably movable within the housing and contacting at least one of the plurality of seat surfaces to form a seal within the ball valve; wherein pressure acting in a first direction and in a second direction opposite the first direction increases the contact pressure of the at least one of the plurality of seat surfaces with the ball; disposing the ball valve within a subterranean formation; and activating the ball valve from an open position to a closed position or from a closed position to an open position. Disposing the ball valve within the subterranean formation may comprise conveying the ball valve within the subterranean formation as part of a wellbore tubular string. The wellbore tubular string may comprise a plurality of the ball valves. The method may also comprise disposing a zonal isolation device within the subterranean formation to force a flow of fluids within the subterranean formation through the ball valve. A position for each of the plurality of seat surfaces may be chosen so that a force on the ball due to a pressure acting in the first direction and a force on the ball due to a pressure acting in the second direction are balanced to within about 20%.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "above" meaning toward the surface of the wellbore and with "down," "lower," "downward," "downstream," or "below" meaning toward the terminal end of the well, regardless of the wellbore orientation. The various characteristics mentioned above, as well as other features and characteristics described in more detail below, will be readily apparent to those skilled in the art with the aid of this disclosure upon reading the following detailed description of the embodiments, and by referring to the accompanying drawings.

The present description is directed to a ball valve for controlling the flow of a fluid, for example in a subterranean wellbore. A seal may be formed in a ball valve by forming a continuous contact surface having a contact pressure in excess of the pressure being sealed against. The ball valve of the present disclosure may have a plurality of seats with seat surfaces that are fixed with respect to one another. The use of a plurality of seats and seat surfaces may provide for redundancy by providing a continuous contact surface, presenting an advantage over valves using a single seat surface. The seat surfaces may be spherically matched and composed of metal to form a metal to metal contact. The resulting seat surfaces are less likely to cause deformation or yielding of the ball and/or the seat surfaces which represents an advantage over ball valves using a knife edge sealing surface. Further, the choice of the position and/or width of the seat surfaces may allow the load to be balanced on the ball and its supports within the ball valve, reducing the peak loads that may be experienced by the components of the ball valve. As a result, the ball valve may be composed of less expensive materials and the overall size of the components may be reduced. These and other advantages will be further described herein.

Figure 1:
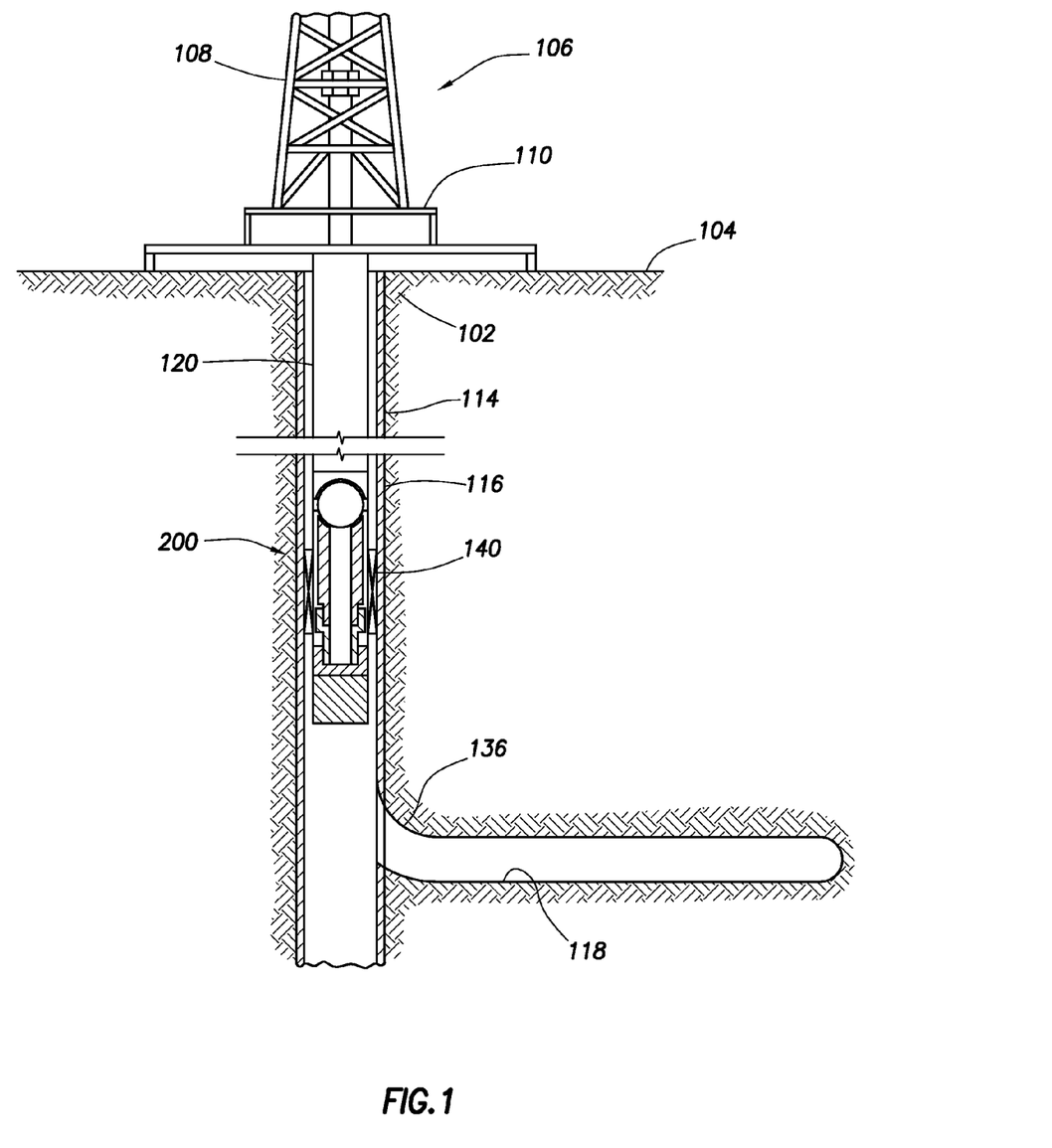
FIG. 1 is a schematic view of an embodiment of a subterranean formation and wellbore operating environment.

Referring to FIG. 1, an example of a wellbore operating environment in which a ball valve 200 may be used is shown. As depicted, the operating environment comprises a workover and/or drilling rig 106 that is positioned on the earth's surface 104 and extends over and around a wellbore 114 that penetrates a subterranean formation 102 for the purpose of recovering hydrocarbons. The wellbore 114 may be drilled into the subterranean formation 102 using any suitable drilling technique. The wellbore 114 extends substantially vertically away from the earth's surface 104 over a vertical wellbore portion 116, deviates from vertical relative to the earth's surface 104 over a deviated wellbore portion 136, and transitions to a horizontal wellbore portion 118. In alternative operating environments, all or portions of a wellbore may be vertical, deviated at any suitable angle, horizontal, and/or curved. The wellbore may be a new wellbore, an existing wellbore, a straight wellbore, an extended reach wellbore, a sidetracked wellbore, a multi-lateral wellbore, and other types of wellbores for drilling and completing one or more production zones. Further the wellbore may be used for both producing wells and injection wells.

A wellbore tubular string 120 comprising a ball valve 200 may be lowered into the subterranean formation 102 for a variety of workover or treatment procedures throughout the life of the wellbore. The embodiment shown in FIG. 1 illustrates the wellbore tubular 120 in the form of a production tubing string comprising a packer 140 disposed in the wellbore 114. It should be understood that the wellbore tubular 120 comprising the ball valve 200 is equally applicable to any type of wellbore tubular being inserted into a wellbore as part of a procedure needing fluid isolation from above or below the ball valve, including as non-limiting examples drill pipe, casing, rod strings, and coiled tubing. Further, a means of isolating the interior of the wellbore tubular string 120 from the annular region between the wellbore tubular string 120 and the wellbore wall 114 may take various forms. For example, a zonal isolation device such as a packer (e.g., packer 140), may be used to isolate the interior of the wellbore tubular string 120 from the annular region to allow for the ball valve 200 to control the flow of a fluid through the wellbore tubular 120.

The workover and/or drilling rig 106 may comprise a derrick 108 with a rig floor 110 through which the wellbore tubular 120 extends downward from the drilling rig 106 into the wellbore 114. The workover and/or drilling rig 106 may comprise a motor driven winch and other associated equipment for extending the wellbore tubular 120 into the wellbore 114 to position the wellbore tubular 120 at a selected depth. While the operating environment depicted in FIG. 1 refers to a stationary workover and/or drilling rig 106 for conveying the wellbore tubular 120 comprising the ball valve 200 within a land-based wellbore 114, in alternative embodiments, mobile workover rigs, wellbore servicing units (such as coiled tubing units), and the like may be used to lower the wellbore tubular 120 comprising the ball valve 200 into the wellbore 114. It should be understood that a wellbore tubular 120 comprising the ball valve 200 may alternatively be used in other operational environments, such as within an offshore wellbore operational environment.

Regardless of the type of operational environment in which the ball valve 200 is used, it will be appreciated that the ball valve 200 serves to control the flow of fluid through a tubular or conduit, including situations in which the flow of fluid occurs from both sides of the ball valve 200. As described in greater detail with reference to FIG. 2, the ball valve 200 comprises a ball 206 that can contact a first seat surface 202 on a first seat 201 and a second seat surface 204 on a second seat 203, where the first seat 201 and the second seat 203 may be disposed on a seating member 208. An outer housing may be disposed about the ball 206 and the seating member 208. The ball valve 200 may also comprise components (e.g., a threaded connection) located above or below the ball 206 to allow the ball valve 200 to be disposed within and/or coupled to a wellbore tubular and/or other wellbore components (e.g., production subs, downhole tools, screens, etc.). While the following discussion describes a ball valve 200 with two seats and seat surfaces for clarity, it should be understood that any plurality of seats and seat surfaces may be used to achieve the results and advantages described herein.

Figure 2:
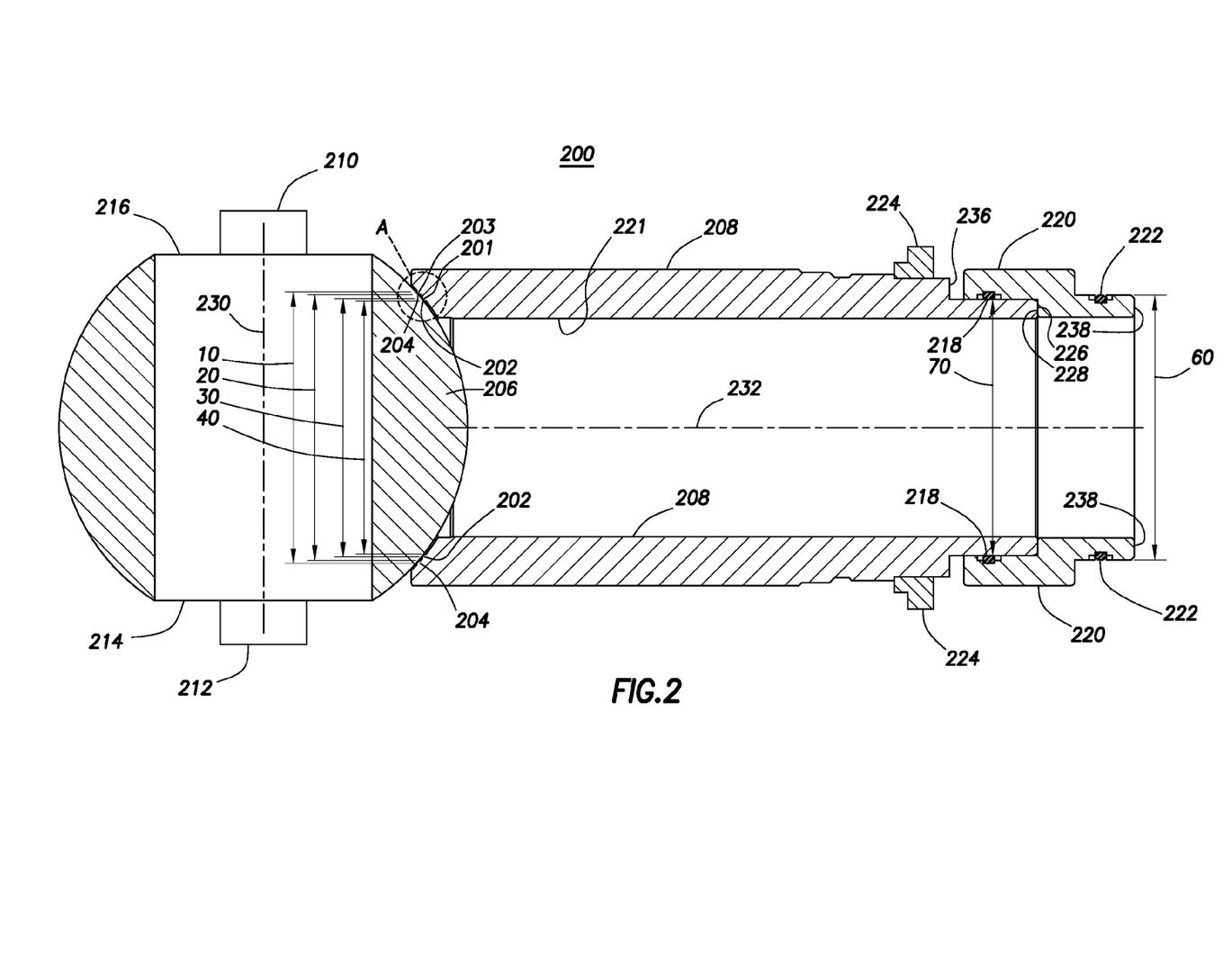
FIG. 2 is a schematic cross sectional view of an embodiment of a ball valve according to the present disclosure.

As shown in FIG. 2, the ball valve 200 servers to control the flow of fluid and may be actuated between an open and closed position. The actuation mechanism may comprise two retaining members on opposite sides of the ball 206 that may be disposed within an outer housing and/or form a portion of the outer housing. The ball 206 may be a truncated sphere with planar surfaces 214, 216 on opposite sides and a fluid passage therethrough. Planar surfaces 214, 216 may each have a cylindrical projection 210, 212 (e.g., trunnion supports) extending outwardly therefrom. An actuation member or means may be arranged to rotate the ball 206 about an axis 230 between the two cylindrical projections 210, 212. In the open position, the ball 206 is rotated to align the fluid passage therethrough with the fluid passage 221 formed within the seating member 208. The ball 206 may be rotated to a closed position in which the fluid passage of the ball is out of alignment with the fluid passage 221 formed within the seating member 208. The actuation member or means may convert a variety of inputs into a rotation of the ball 206 including a pressure input from above or below the ball valve 200, a longitudinal movement of the housing and/or the ball valve 200, a rotational movement of the housing and/or the ball valve 200, or any combination thereof. The ability to convert these inputs into a rotation of the ball 206 may allow the ball valve 200 to be actuated remotely, for example from the surface of a wellbore. As used herein, the longitudinal direction extends along a central longitudinal axis 232 extending through the ball valve 200, which may in some embodiments, align with the central longitudinal axis 232 of a wellbore tubular in which the ball valve 200 is disposed. As used herein, rotational movement of the ball valve 200 may refer to angular motion about the central longitudinal axis 232 of the ball valve 200, which may be distinct from the rotational axis 230 of the ball 206 itself when being rotated between a closed position to an open position, or an open position to a closed position.

Figure 3:
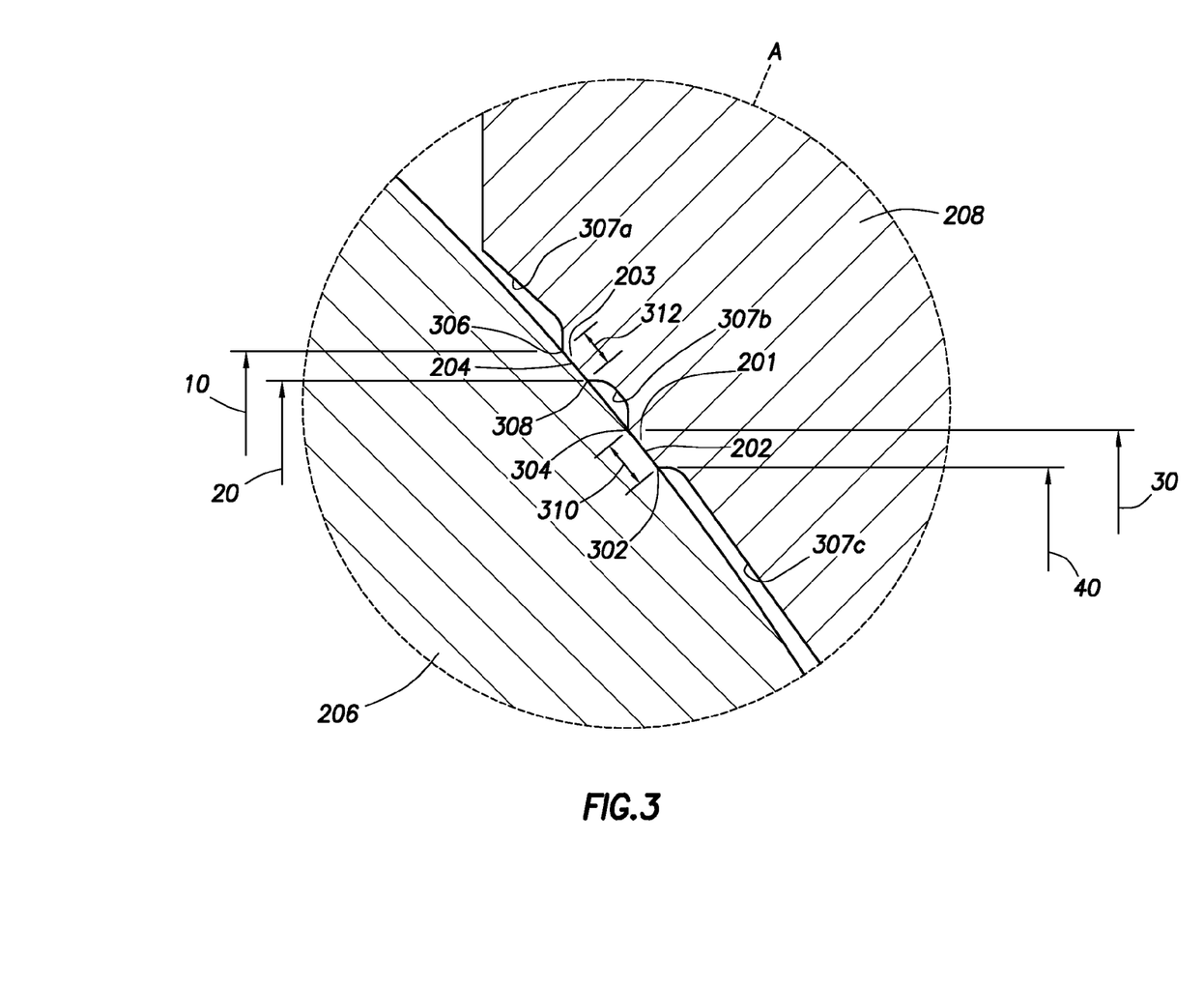
FIG. 3 is a schematic cross sectional view of an embodiment of the seats and seat surfaces as called out in detail A of FIG. 2.

As shown in FIG. 3, the first seat surface 202 and/or the second seat surface 204 may be in contact with the ball 206 and act to form a seal against the flow of fluid through the ball valve 200 when the ball valve 200 is in a closed position. The first seat 201 and the second seat 203 may comprise raised lands or protrusions on the surface of the seating member 208. In an embodiment, the first seat 201 and/or the second seat 203 may have a stepped configuration on the surface of the seat member 208.

In an embodiment, the first seat surface 202 and the second seat surface 204 may be spherically matched to the surface of the ball 206, which may comprise a spherical surface that contacts the seat surfaces 202, 204. In an embodiment, neither the first seat surface 202 nor the second seat surface 204 may comprise a knife edge. A knife edge seat has a sharp edge in contact with the ball 206 to form a seal. However, as the contact pressure of the ball 206 with the knife edge seat increases, the ball and/or the knife edge seat material may yield beyond its elastic limit, leading to a permanent deformation of the ball 206 and/or the seat. The resulting deformation may reduce the ability of the ball valve 200 to form a suitable seal. Through the use of a matched surface contact, the ball valve 200 of the present disclosure may reduce or avoid any deformation of the ball 206, the seats 201, 203, and/or seat surfaces 202, 204, enabling a consistent seal to be formed each time the ball valve 200 is closed. In an embodiment, the ball 206, the seats 201, 203, and/or the matched seat surfaces 202, 204 may grow while undergoing elastic deformation, but may not pass the yield point to undergo plastic deformation.

The seat surfaces 202, 204 may be spherically matched to the ball 206 during the manufacturing process by starting with a spherically matched surface on the seating member 208 and removing a portion of the seating member 208 so that the first seat 201 with first seat surface 202 and the second seat 203 with the second seat surface 204 remain. A variety of manufacturing techniques such as etching, abrasion, milling, or any other technique may be used to remove portions 307a, 307b, and 307c of the seating member 208 to form the seats 201, 203 and corresponding seat surfaces 202, 204. In another embodiment, the first seat 201 and the second seat 203 may be formed on the seating member 208 and subsequently machined to have a spherically matched surface with the ball 206. The first seat 201, the second seat 203, and the seating member 208 may be formed of a suitable material such as metal. Suitable metals may be chosen based on several considerations including, but not limited to, the expected operating conditions of the ball valve 200 (e.g., the temperature, the operating pressures), the expected forces on the ball valve 200, and the chemical composition of the fluid in contact with the components of the ball valve 200. The ball 206 may also be formed from a suitable metal so that the seal formed between the ball 206 and the first seat surface 202 and/or the second seat surface 204 comprises a metal to metal contact.

As shown in FIG. 3, the first seat surface 202 and the second seat surface 204 may be in contact with ball 206. The first seat 201 with first seat surface 202 and the second seat 203 with the second seat surface 204 may be positioned on the seating member 208 so that a pressure boost effect (i.e., a piston effect) acts to aid in forming a seal and balance the load on the ball 206, as described in more detail below. In an embodiment, a first edge 302 of first seat surface 202 may be located at a diameter 40 as measured through the central longitudinal axis 232 of the ball valve 200, and a second edge 304 of first seat surface 202 may be located at a diameter 30 as measured through the central longitudinal axis 232 of the ball valve 200. A first edge 306 of second seat surface 204 may be located at a diameter 10 as measured through the central longitudinal axis 232 of the ball valve 200, and a second edge 308 of second seat surface 204 may be located at a diameter 20 as measured through the central longitudinal axis 232 of the ball valve 200. Since the diameters 10, 20, 30, and 40 represent the distances at which the seat surfaces 202, 204 contact the ball 206, the diameters 10, 20, 30, and 40 may be referred to as "seat surface diameters."

As shown in FIG. 2, the ball valve 200 may also comprise a body member 220. The body member 220 may be slidingly engaged with seating member 208. A first seal 218, for example an O-ring, may be provided between the outer surface of the seating member 208 and the inner surface of the body member 220 to prevent the flow of fluids between the body member 220 and the seating member 208. An upper surface 226 of the body member 220 may engage a lower surface 228 of the seat member 208 to transfer any force from the body member 220 to the seat member 208 when pressure is applied from below the ball valve 200. A second seal 222 may be provided between the outer surface of the body member 220 and the housing of the ball valve 200 to allow for a sliding engagement of the body member 220 within the housing while preventing the flow of fluids between the body member 220 and the housing. The lower surface 236 of the seating member 208 over which pressure from above may act has an outer surface located at the seal 218, which is at a diameter 70 as measured through the central longitudinal axis 232 of the ball valve 200. The lower surface 238 of the body member 220 over which pressure from below may act has an outer surface located at seal 222, which is at a diameter 60 as measured through the central longitudinal axis 232 of the ball valve 200. Since the diameters 60, 70 represent the distances at which pressure can act from below or above, respectively, and are based on the first seal 218 and the second seal 222, the diameters 60, 70 may be referred to as "sealing diameters."

As shown in FIG. 2, the ball valve 200 may comprise a biasing device 224 such as a spring to provide a constant pre-load on the seating member 208, thus providing a biasing force to urge the first seat surface 202 and/or the second seat surface 204 to contact the ball 206 via the seating member 208. In an embodiment, the biasing device 224 may be disposed behind the seating member 208.

The first seat surface 202 may provide the primary sealing surface when pressure is applied from below. A pressure boost effect may be created due to the action of the pressure from below on the differential area between the sealing diameter 60 of the body member 220 and the diameter 40 of the first edge 302 of the first seat surface 202. The second seat surface 204 may provide the primary sealing surface when pressure is applied from above. A pressure boost effect may be created due to the action of the pressure from above on the differential area between the diameter 10 of the first edge 306 of the second seat surface 204 and the sealing diameter 70 of the seating member 208.

The plurality of seats and seat surfaces may create a redundancy to allow the ball valve 200 to maintain a seal under the various conditions experienced during the use of the ball valve 200, which may be useful in a variety of situations. For example, the seat surface 202, 204 may become damaged during the closing of a ball valve 200, leading to an inability to form an adequate seal. The types of fluids passing through the ball valve 200 can vary widely and can include abrasive materials such as formation solids and/or fracturing proppant. When coupled with high flow rates (e.g., 15 to 20 barrels per minute), the fluid velocity passing through the ball valve 200 and over the seat surfaces 202, 204 can approach and/or exceed the erosion and cutting velocity limits of common ball valve construction materials. The erosion and cutting effects tend to increase as the solids content of the fluid increases and the fluid velocities increase. During the closing of the ball valve 200, the available flow cross section through the ball valve 200 decreases, resulting in an increased flow rate of the fluid through the ball valve 200 and over the seat surfaces 202, 204. In ball valves with a single seat surface, the erosion and/or cutting of the surface may lead to a failure of the seal. As an advantage over single seat systems, the ball valve 200 of the present disclosure allows for the use of a plurality of seats 201, 203 and seat surfaces 202, 204 that may be wider than traditional knife edge contact surfaces to allow for some redundancy in the ability to form a seal. Thus, the present ball valve 200 may be capable of handling harsher conditions and/or being exposed to erosive materials for a longer time than a single seat ball valve.

The redundancy may be created in the sealing ability of the ball valve 200 through the use of a plurality of seats and seat surfaces. When pressure is acting from above, the second edge 308 of the second seat surface 204 may act as a secondary seal with a pressure boost effect being created due to the action of the pressure from above on the differential area between the diameter 20 of the second edge 308 and the sealing diameter 70 of the seating member 208. The second edge 304 of the first seat surface 202 may act as a tertiary seal when pressure acts from above with a pressure boost effect being created due to the action of the pressure from above on the differential area between the diameter 30 of the second edge 304 of the first seat surface 202 and the sealing diameter 70 of the seating member 208. When pressure is acting from below, the second edge 304 of the first seat surface 202 may act as a secondary seal with a pressure boost effect being created due to the action of the pressure from below on the differential area between the diameter 30 of the second edge 304 and the sealing diameter 60 of the body member 220. The second edge 308 of the second seat surface 204 may act as a tertiary seal when pressure acts from below with a pressure boost effect being created due to the action of the pressure from below on the differential area between the diameter 20 of the second edge 308 of the second seat surface 204 and the sealing diameter 60 of the body member 220.

In an embodiment, the load on the ball 206 may be balanced through the selection of the seat surface diameters and the sealing diameters. The selection of the seat surface diameters 10, 20, 30, 40, the sealing diameters 60, 70 of the seat member 208 and the body member 220, and/or the width of each seat surface 202, 204 may be selected so that the load placed on the ball 206 via the seat surfaces 202, 204 may be matched when pressure is applied from above the ball valve 200 and when pressure is applied from below the ball valve 200. In an embodiment, the load placed on the ball's 206 cylindrical projections 210, 212 by the first edge 306 of the second seat surface 204 with pressure applied from above may be balanced with the load placed on the cylindrical projections 210, 212 by the first edge 302 of the first seat surface 202 when pressure is applied from below. In an embodiment, the load placed on the ball 206 and/or the cylindrical projections 210, 212 when pressure is applied from above and when pressure is applied from below may be within about 20%, alternatively within about 10%, or alternatively within about 5% of each other. In an embodiment, the load placed on the ball 206 and/or the cylindrical projections 210, 212 when pressure is applied from above and when pressure is applied from below may be within about 30,000 pounds-force ($lb_f$), alternatively about 20,000 $lb_f$, alternatively about 10,000 $lb_f$, alternatively less than 5,000 $lb_f$.

Several considerations may be taken into account when balancing the load on the ball valve 200 including the selection of the seat surface diameters 10, 20, 30, 40 relative to the sealing diameters 60, 70 of the seat member 208 and the body member 220, and the selection of the width of the seat surfaces 202, 204. The load on the ball 206 and the cylindrical projections 210, 212 may result from the force applied to the ball 206 based on an unbalanced pressure from above or below the ball 206 and the force resulting from the pressure boost effect as described above. The choice of the seat surface diameters 10, 20, 30, 40 relative to the sealing diameters 60, 70 can be used to vary the surface area available for an unbalanced pressure to act on the ball 206. The relative difference in areas between the seat surface diameters 10, 20, 30, 40 and the sealing diameters 60, 70 may be used to vary the amount of force due to the pressure boost on the ball 206.

In an embodiment, the seat surface diameters 10, 20, 30, 40 and the sealing diameters 60, 70 may be chosen to balance the load on the ball 206 and increase the contact pressure of the first seat surface 202 and the second seat surface 204 with the ball 206 when pressure is acting from above or below the ball valve 200. In an embodiment, the seat surface diameter 40 may be less than the sealing diameter 60. In an embodiment, the seat surface diameter 30 may be less than the sealing diameter 60. In an embodiment, the seat surface diameter 20 may be less than the sealing diameter 60. In an embodiment, the seat surface diameter 10 may be less than the sealing diameter 60. In an embodiment, the seat surface diameter 10 may be greater than the sealing diameter 70. In an embodiment, the seat surface diameter 20 may be greater than the sealing diameter 70. In an embodiment, the seat surface diameter 30 may be greater than the sealing diameter 70. In an embodiment, the seat surface diameter 40 may be greater than the sealing diameter 70. In an embodiment, the sealing diameter 60 may be greater than the sealing diameter 70.

The width of the seat surfaces 202, 204 may affect the contact pressure between the seat surfaces 202, 204 and the ball 206, and the resistance to rotating the ball 206 between the open and closed positions. The width of the seat surfaces 202, 204 refers to the length of the seat surface 202, 204 in contact with the ball 206 in the direction of the central longitudinal axis 232 of the ball valve 200. Thus the width of the first seat surface 202 may be the length of the seat surface that can contact the ball 206 between distance 30 and distance 40, and the width of the second seat surface 204 may be the length of the seat surface that can contact the ball 206 between distance 10 and distance 20. The width of the first seat surface 202 and/or the second seat surface 204 may be the same around the circumference of the seat surface or may vary. In an embodiment, the choice of the seat surface diameters 10, 20, 30, 40, and thus the width, of the first seat surface 202 and/or the second seat surface 204 may be chosen to reduce the contact pressure between the ball 206 and the seat surface to a value that is less than the pressure that may result in yielding of the seat 201, 203 and/or the ball 206 material.

In an embodiment, the width of the first seat surface 202 and/or the second seat surface 204 may be chosen to limit the clutch loading on the ball 206 when the ball 206 is opened or closed with a differential pressure across the ball valve 200. As used herein, clutch loading may refer to the drag or friction force that arises due to the contact between the seat surfaces 202, 204 and the ball 206 and generally resists relative motion between the ball 206 and the seat surfaces 202, 204. In an embodiment, the actuation member or means may be limited in the amount of torque that can be applied to the ball 206 to open or close the ball valve 200. By selecting the seat surface diameters 10, 20, 30, 40, and thus the width, the clutch loading may be limited to a value below the amount of torque that can be exerted by the actuation means or member. The use of a plurality of seat surfaces may allow for a sufficient contact pressure to achieve a seal while limiting the clutch loading on the ball 206. This represents an advantage over the use of a valve with a single seat surface since the use of a single seat surface with the outermost seat surface diameter matching seat surface diameter 10 and the innermost seat surface diameter matching seat surface diameter 40 could result in a clutch loading exceeding the torque available for actuating the ball valve 200 or a contact pressure too low to achieve a seal.

The selection of the seat surface diameters 10, 20, 30, 40 and the sealing diameters 60, 70 to balance the load on the ball 206 and the cylindrical projects 210, 212 may allow for the use of different materials of construction for the components of the ball valve 200. For example, the cylindrical projects 210, 212 may be formed from a less expensive material since the peak force on the ball 206 may be reduced through the balancing of the load. Further, the ball 206, the seat member 208, the first seat 201, and the second seat 203 may be formed from a less expensive material that may have a lower yield strength since the pressure on the seat surfaces 202, 204 and the ball 206 can be controlled through the selection of the seat surface diameters 10, 20, 30, 40 and the sealing diameters 60, 70. The physical dimensions of the components may also be reduced due to the balancing of the load on the ball 206. The resulting ball valve 200 may be less expensive to produce and may also have a larger throughbore due to the reduced component dimensions.

Returning to FIG. 1, the ball valve 200 may be used to control the flow of a fluid in a subterranean wellbore 114. In an embodiment, a ball valve 200 as described herein may be provided and disposed within the wellbore 114 in a subterranean formation 102. The ball valve 200 may form a part of a wellbore tubular string 120 and may be conveyed into and/or out of the wellbore 114 as part of the wellbore tubular string 120. Additional wellbore components such as one or more zonal isolation devices 140 may be used in conjunction with the ball valve 200 to control the flow of a fluid within the wellbore 114. In some embodiments, one or more ball valves 200 may be used with a wellbore tubular string 120 to control the flow of fluids within various zones of wellbore 114. The use of the ball valve 200 as disclosed herein may allow for control of the flow of a fluid into or out of the wellbore. In order to control the flow of a fluid in the wellbore 114, the ball valve 200 may be activated from an open position to a closed position or from a closed position to an open position. In an embodiment, the ball valve 200 may be activated to any point in between an open position and a closed position.

While the ball valve 200 is depicted in FIG. 2 with the seats 201, 203 and corresponding seat surfaces 202, 204 located below the ball 206, it is expressly envisioned that the seats 201, 203 could be located in alternative orientations with respect to the ball 206. In an embodiment, the seats 201, 203 and corresponding seat surfaces 202, 204 could be positioned so as to contact the upper side of the ball 206. In an embodiment, the plurality of seat surfaces may be located on the same hemisphere of the ball 206. In a further embodiment, a plurality of seat surfaces may be positioned so as to act on different hemispheres of the ball 206, for example on both the upper and lower sides of the ball 206. Such an embodiment may provide a plurality of redundant seat surfaces. While the ball valve 200 is described in the context of a subterranean wellbore, it should be understood that the ball valve 200 of the present disclosure may be used in an industry or use in which it is desirable to control the flow of a fluid that may have a differential pressure from either side of the ball valve 200.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims.

Each and every claim is incorporated as further disclosure into the specification and the claims are embodiment(s) of the present invention.

What is claimed is:

1. A ball valve comprising:
a housing;
a first seat surface;
a second seat surface, wherein the first seat surface and the second seat surface are fixed relative to each other; and
a ball rotatably movable within the housing and contacting at least one of the first seat surface and the second seat surface to form a seal within the ball valve;
wherein the ball valve is configured so that a pressure acting in a first direction and in a second direction opposite the first direction increases the contact pressure of the first seat surface and the second seat surface with the ball.

2. The ball valve of claim 1, further comprising a connection component configured to allow the ball valve to be connected to additional components.

3. The ball valve of claim 1, further comprising an actuation mechanism configured to open or close the ball valve.

4. The ball valve of claim 1, wherein at least one of the first seat surface and the second seat surface comprise raised lands on the surface of a seat member.

5. The ball valve of claim 1, wherein the ball comprises a spherical surface and wherein the first seat surface and the second seat surface are spherically matched to the surface of the ball.

6. The ball valve of claim 1, wherein a position of the first seat surface and a position of the second seat surface are chosen so that a force on the ball due to a pressure acting in the first direction and a force on the ball due to a pressure acting in the second direction are balanced to within about 20%.

7. The ball valve of claim 1, further comprising a biasing device arranged to bias the first seat surface and the second seat surface into a position in which they are in contact with the ball.

8. A ball valve comprising:
a housing;
a seat member with a first sealing diameter;
a plurality of seat surfaces with corresponding seat surface diameters disposed on the seat member, wherein the plurality of seat surfaces are fixed relative to each other;
a body member with a second sealing diameter disposed in sealing contact with the seat member, wherein the sealing contact between the body member and the seat member occurs at the first sealing diameter; and
a ball rotatably movable within the housing and contacting at least one of the plurality of seat surfaces to form a seal within the ball valve;
wherein the seat surface diameters and the first sealing diameter are configured to provide a first force on the ball clue to a pressure from above the ball, wherein the seat surface diameters and the second sealing diameter are configured to provide a second force on the ball due to a pressure from below the ball, and wherein the first force on the ball due to a pressure from above the ball and the second force on the ball due to a pressure from below the ball are balanced to within about 20%.

9. The ball valve of claim 8, wherein the ball comprises a spherical surface and wherein the plurality of seat surfaces are spherically matched to the surface of the ball.

10. The ball valve of claim 8, wherein the ball and the plurality of seat surfaces are metal, and wherein a metal to metal seal is formed between the ball and the plurality of seat surfaces.

11. The ball valve of claim 8, wherein a diameter of an innermost edge of an innermost seat surface of the plurality of seat surfaces is less than the second sealing diameter.

12. The ball valve of claim 8, wherein a diameter of an outermost edge of an outermost seat surface of the plurality of seat surfaces is greater than the first sealing diameter.

13. The ball valve of claim 8, wherein the second sealing diameter is greater than the first sealing diameter.

14. The ball valve of claim 8, wherein the plurality of seat surfaces are configured to engage a same hemisphere of the ball.

15. The ball valve of claim 8, wherein the seat surface diameters, the first sealing diameter, and the second sealing diameter are chosen so that the first force on the ball due to a pressure from above the ball and the second force on the ball due to a pressure from below the ball are balanced to within about 30,000 pounds-force.

16. A method comprising:
increasing a first contact pressure between a ball in a ball valve and a first seat surface of a plurality of seat surfaces in response to a pressure differential across the ball valve in a first direction, wherein the plurality of seat surfaces are fixed relative to each other, wherein the ball is rotatably movable within a ball valve housing, and wherein the ball is configured to contact at least one of the plurality of seat surfaces to form a seal within the ball valve; and
increasing a second contact pressure between the ball in the ball valve and a second seat surface of the plurality of seat surfaces in response to a pressure differential across the ball valve in a second direction, wherein the first direction is opposite of the second direction.

17. The method of claim 16, further comprising conveying the ball valve within a subterranean formation as part of a wellbore tubular string.

18. The method of claim 17, further comprising disposing a zonal isolation device within the subterranean formation to direct a flow of fluids within the subterranean formation through the ball valve.

19. The method of claim 17, wherein the wellbore tubular string comprises a plurality of the ball valves.

20. The method of claim 16, wherein a position for each of the plurality of seat surfaces are chosen so that a force on the ball due to the pressure differential acting across the ball valve in the first direction and a force on the ball due to the pressure differential acting across the ball valve in the second direction are balanced to within about 20%.

* * * * *

UNITED STATES PATENT AND TRADEMARK OFFICE
CERTIFICATE OF CORRECTION

| | | |
|---|---|---|
| PATENT NO. | : 8,607,882 B2 | Page 1 of 1 |
| APPLICATION NO. | : 13/095286 | |
| DATED | : December 17, 2013 | |
| INVENTOR(S) | : Frank David Kalb et al. | |

It is certified that error appears in the above-identified patent and that said Letters Patent is hereby corrected as shown below:

In the Claims:

In Column 11, Claim 8, line 54, replace "ball clue" with --ball due--.

Signed and Sealed this
Fourth Day of March, 2014

Michelle K. Lee
*Deputy Director of the United States Patent and Trademark Office*